United States Patent
Natsume et al.

(10) Patent No.: US 6,337,656 B1
(45) Date of Patent: Jan. 8, 2002

(54) MONOPULSE RADAR APPARATUS

(75) Inventors: Kazuma Natsume, Kariya; Hiroshi Hazumi, Nagoya; Hiroaki Kumon, Kariya, all of (JP)

(73) Assignee: Denso Corporation, Kariya (JP)

( * ) Notice: Subject to any disclaimer, the term of this patent is extended or adjusted under 35 U.S.C. 154(b) by 29 days.

(21) Appl. No.: 09/583,534

(22) Filed: Jun. 1, 2000

(30) Foreign Application Priority Data

Jun. 3, 1999 (JP) .......................................... 11-156467
Mar. 8, 2000 (JP) .......................................... 2000-63635

(51) Int. Cl.[7] ............................................. G01S 13/00
(52) U.S. Cl. ..................................................... 342/149
(58) Field of Search ........................... 342/149, 70, 71, 342/72

(56) References Cited

U.S. PATENT DOCUMENTS 5,757,307 A    5/1998  Nakatani et al. ............... 342/70
5,977,904 A *  11/1999 Mizuno et al. ................. 342/70
6,198,426 B1 * 3/2001  Tamatsu et al. ............... 342/70

FOREIGN PATENT DOCUMENTS

| JP | 62-197776 | 9/1987 |
|---|---|---|
| JP | 62-259077 | 11/1987 |
| JP | 7-336135 | 12/1995 |
| JP | 9-152478 | 6/1997 |
| JP | 10-332821 | 12/1998 |
| JP | 11-125672 | 5/1999 |

* cited by examiner

Primary Examiner—Daniel T. Pihulic
(74) Attorney, Agent, or Firm—Law Offices of David G. Posz

(57) ABSTRACT

A radar apparatus is provided which is capable of discriminating between azimuth angles of two or more targets moving side by side close to each other. The radar apparatus provides antenna beams which partially overlap with each other to define a plurality of monopulse areas and processes input signals produced in each of the monopulse areas to obtain angular direction data. The radar apparatus determines a time-sequential variation in angular direction data in each of the monopulse areas and determines the angular direction data whose variation is within a preselected allowable range as being effective in determining the angular direction of each target correctly.

8 Claims, 15 Drawing Sheets

| AREA | M1 | M2 | M3 | M4 | M5 | M6 | M7 | M8 | M9 |
|---|---|---|---|---|---|---|---|---|---|
| DETECTION | × | ○ | ○ | ○ | △ | △ | ○ | ○ | × |

○: STABLE    △: INSTABLE    ×: NOT DETECTED

| AREA | M1 | M2 | M3 | M4 | M5 | M6 | M7 |
|---|---|---|---|---|---|---|---|
| DETECTION | × | ○ | ○ | △ | ○ | ○ | × |

○: STABLE    △: INSTABLE    ×: NOT DETECTED

MONOPULSE RADAR APPARATUS

BACKGROUND OF THE INVENTION

1. Technical Field of the Invention

The present invention relates generally to a monopulse radar apparatus designed to determine the azimuth of a target, and more particularly to an improvement on such a monopulse radar apparatus which is capable of discriminating between targets located close to each other within a radar detectable zone with high accuracy.

2. Background Art

Automotive radar systems are known which are designed to track a target object such as an obstacle or a preceding vehicle for cruise control and/or anti-collision control. It is important for such automotive radar systems to obtain azimuth data for specifying an accurate positional relation between a radar-mounted vehicle and a target as well as the distance to and relative speed of the target. This is accomplished, for example, with beam scan systems or monopulse systems. The beam scan systems, as shown in FIG. 11($a$), measure levels of returns of radar waves whose directivities are different from each other to obtain a received signal level distribution, as shown in FIG. 11($b$), and selects one of the returns whose signal level is the greatest in the distribution as indicating the azimuth or angular direction of a target object. The monopulse systems, as shown in FIG. 12($a$), receive radar returns simultaneously through a pair of receiving antennas a and b spaced slightly from each other (by a distance D in the drawing) to determine a phase difference between the received signals which arises from a difference in distance d (=D·sin θ) the radar returns have traveled if the angle which the direction of incoming of each of the radar returns makes with a line perpendicular to a front plane of the receiving antennas a and b is defined as θ or an amplitude difference between the received signals (see FIGS. 13($a$) and 13($b$)) which arises from a difference in beam directivity of the receiving antennas.

It is possible for the monopulse systems to measure the azimuth of the target object accurately only in an area where beams of the two antennas overlap with each other (will be referred to as a monopulse area below). Some of the monopulse systems, thus, increase a detectable range by using more than three receiving antennas arrayed so that adjacent two of the receiving antennas form the monopulse area for measurement of the azimuth. For example, Japanese Patent First Publication Nos. 9-152478 and 62-259077 teach such systems.

Improvement of measurement accuracy of the azimuth in the beam scan systems requires formation of fine beams, which requires increase in size (i.e., an aperture) of the antennas. However, when the beam scan systems are used as an automotive radar, mounted antennas are limited in size, which may lead to a difficulty in obtaining desired accuracy of the measurement.

The monopulse systems have a drawback in that when a plurality of targets are present at the same interval away from a radar-mounted vehicle such as when two automobiles are running side by side in front of the radar-mounted vehicle, it will cause an error to occur in measuring the azimuth. Specifically, when two automobiles are running in parallel to each other at substantially the same speed, radar returns from the two automobiles which have substantially the same frequency are received by the monopulse system as a composite wave. Usually, automotive radar use millimeter waves. The wavelength of a radar return will, thus, be on the order of several mm, so that the phase of the radar return changes greatly even when the distance to the target is changed in units of millimeter.

When two target automobiles are running side by side, but only one of them is located within a monopulse area (at a position, as indicated by ① in a graph of FIG. 14($a$)), a radar wave (i.e., a vector, as indicated by a broken line ①) reflected from the one of the target automobiles in the monopulse area and a radar wave (i.e., a vector, as indicated by a solid line ②) reflected from the other target automotibile lying out of the monopulse area (at a position, as indicated by ② in the graph) are different in signal level when received by the monopulse system, so that a composite wave (i.e., a vector, as indicated by a solid line) in which the two reflected radar waves are mixed will approximate to the radar wave reflected from the target automobile within the monopulse area, thereby enabling information on the azimuth to be obtained accurately. However, when two target automobiles are, as shown in FIG. 14($b$), both located within the monopulse area, radar waves (vectors, as indicated by broken lines ① and ②) reflected from the two automobiles, received by the monopulse system have substantially the same signal level, so that a composite wave thereof (i.e., a vector, as indicated by a solid line) shows the direction greatly different from angular directions of the target automobiles. This also causes only one of the target automobiles to be detected.

Specifically, in the monopulse system, radar waves reflected from a pair of targets lying within the same monopulse area are mixed in vector to produce a composite wave which is different in phase and amplitude from either of the reflected radar waves, thereby making it difficult to measure the azimuth of the targets using the phase and amplitude of the reflected radar waves.

SUMMARY OF THE INVENTION

It is therefore a principal object of the present invention to avoid the disadvantages of the prior art.

It is another object of the present invention to provide a radar apparatus designed to discriminate between targets close to each other for measuring angular directions thereof with high accuracy.

According to one aspect of the invention, there is provided a radar apparatus which comprises: (a) a transmitter transmitting a radar wave; (b) a signal receiver providing antenna beams which overlap with each other to define a plurality of monopulse areas, the signal receiver receiving a return of the radar wave from a target object in each of the monopulse areas to produce a pair of input signals; (c) an angular direction data determining circuit processing the input signals produced in each of the monopulse areas to obtain angular direction data, in time sequence, each indicating an angular direction of the target object based on differences in one of amplitude and phase between components of the input signals; and (d) a variation determining circuit determining a variation in angular direction data obtained, in time sequence, in each of the monopulse areas. If the variation is within a preselected allowable range, the variation determining circuit determines its angular direction data as being effective in determining an angular direction of the target object correctly.

For instance, when two target vehicles are running side by side in front of a radar-mounted vehicle, the radar apparatus receives a mixture of returns of a radar wave from the target vehicles in the monopulse area. This mixed radar return is different in phase and amplitude from each of the returns from the target vehicles and changes greatly with a slight change in distance between the radar-mounted vehicle and the target vehicles, thus resulting in a great change in azimuth measured by monitoring the mixed radar return cyclically. The radar apparatus of this invention, thus, monitors, in time sequence, the azimuth data in each of the monopulse areas and ignore some of the azimuth data whose time-sequential variation is out of an allowable range when determining the angular direction of each target, which improves stability and reliability of control using the azimuth data.

In the preferred mode of the invention, the signal receiver is designed to provide the antenna beams so that adjacent two of the monopulse areas partially overlap with each other. It is also advisable that the monopulse areas overlap with each other so that the returns from two target vehicles running side by side at the same interval away from the radar-mounted vehicle may be received with different signal levels whose difference is greater than a preselected reference value.

The signal receiver includes a three or more receiving antennas which are located so as to have the antenna beams oriented in different directions, respectively, and so that adjacent two of the antenna beams define one of the monopulse areas.

The signal receiver may include a plurality of receiving antennas arrayed in line to have antenna beams thereof oriented in the same direction and a signal processing circuit summing outputs from the receiving antennas with given weighting to form the beams. In this case, the signal processing circuit may be made to have a so-called phased array antenna structure which includes a phase shifter changing the phase of the antenna outputs to weight the antenna outputs and an adder adding outputs of the phase shifter together or includes an analog-to-digital converter sampling the outputs of the receiving antennas to produce digital signals and an arithmetic circuit performing a complex Fourier Transform on the digital signals in space series along an array of the receiving antennas, thereby forming the so-called digital beams.

The arithmetic circuit may add null dummy signals to the digital signals produced by the analog-to-digital converter to increase the number of signals to undergo the complex Fourier Transform simultaneously more than the number of the outputs from the receiving antennas. This technique is called zero-padding which is taught in, for example, chapter 11 Irregular Vibration and Spectrum Analysis, published by Ohm Company. Specifically, the addition of the dummy signals causes the number of receiving antennas to be increased logically, which will increase the number of antenna beams within the radar detectable zone, thereby resulting in increased accuracy in measuring the azimuth of the target.

If a plurality of targets are within the radar detectable zone at substantially the same distance from the radar apparatus, the formation of the monopulse areas of which adjacent two monopulse areas partially overlap with each other enables effective azimuth data on the same target to be obtained in some of the monopulse areas. For example, assuming that adjacent two of nine monopulse areas M1 to M9, as shown in FIG. 15(a), overlap with each other in three-fourths (¾) thereof, and that two targets T1 and T2 are present, the monopulse areas M2 to M4 detect only the target T1. The monopulse areas M5 and M6 detect both the targets T1 and T2, but it is impossible to measure the azimuth thereof accurately because returns of a radar wave from the targets T1 and T2 are received with substantially the same signal levels. The monopulse areas M7 to M8 detect only the target T2. The monopulse areas M1 and M9 detect no targets. Specifically, the azimuth data on either of the targets T1 and T2 is obtained two or more of the monopulse areas M1 to M9.

Assuming that adjacent two of seven monopulse areas M1 to M7, as shown in FIG. 15(b), overlap with each other in one-half (½) thereof, and that the width of targets T1 and T2 is greater than half of the width of each of the monopulse areas M1 to M7, the monopulse areas M2 and M3 detect only the target T1. The monopulse area M4 detects both the targets T1 and I2, but it is impossible to measure the azimuth thereof accurately because returns of a radar wave from the targets T1 and T2 are received with substantially the same signal levels. The monopulse areas M5 and M6 detect only the target T2. The monopulse areas M1 and M7 detect no targets. Specifically, the azimuth data on either of the targets T1 and T2 is obtained two or more of the monopulse areas M1 to M7.

In the above cases, the radar apparatus may include: (a) a transmitter transmitting a radar wave; (b) a signal receiver providing antenna beams which overlap with each other to define a plurality of monopulse areas, the signal receiver receiving a return of the radar wave from a target object in each of the monopulse areas to produce a pair of input signals; (c) an angular direction data determining circuit processing the input signals produced in each of the monopulse areas to obtain angular direction data each indicating an angular direction of the target object based on differences in one of amplitude and phase between components of the input signals; and (d) a grouping circuit, if some of the angular direction data are close to each other within a given range, forming a group including the angular direction data close to each other within the given range; and (e) a determining circuit determining the angular direction data in the group as values effective in determining an angular direction of the target object.

The radar apparatus may alternatively include: (a) a transmitter transmitting a radar wave; (b) a signal receiver providing antenna beams which overlap with each other to define a plurality of monopulse areas, the signal receiver receiving a return of the radar wave from a target object in each of the monopulse areas to produce a pair of input signals; (c) an angular direction data determining circuit processing the input signals produced in each of the monopulse areas to obtain angular direction data each indicating an angular direction of the target object based on differences in one of amplitude and phase between components of the input signals; and (d) a grouping circuit forming groups each including some of the angular direction data which are close to each other within a given range; and (e) a determining circuit determining the angular direction data belonging to one of the groups whose time-sequential variation is within a preselected range as values effective in determining an angular direction of the target object.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
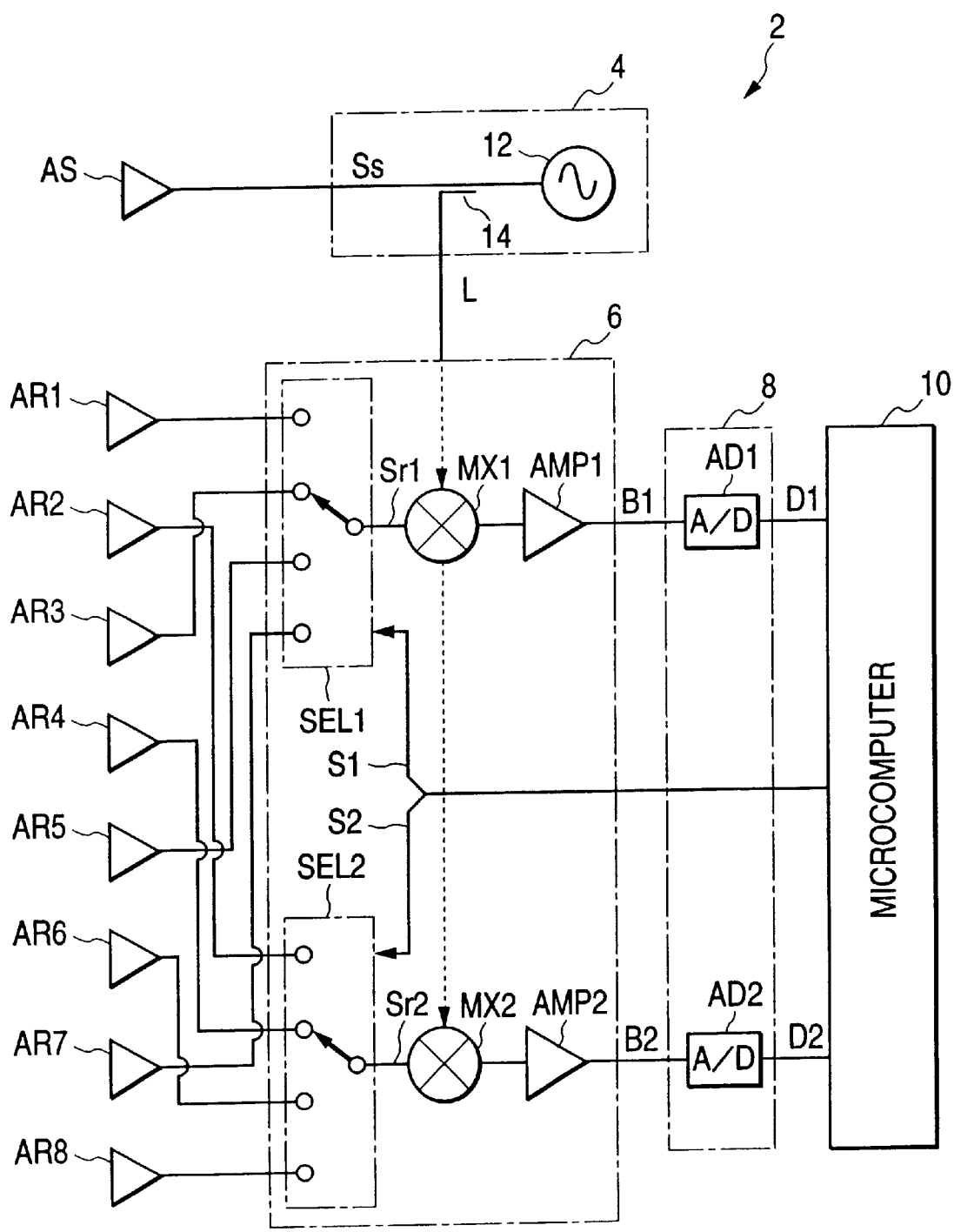
FIG. 1 is a block diagram which shows a radar apparatus according to the first embodiment of the invention.

Referring now to the drawings, wherein like numbers refer to like parts in several views, particularly to FIG. 1, there is shown an automotive radar apparatus 2 according to the first embodiment of the invention which may be employed in automotive anti-collision systems or radar cruise control systems to detect the presence of obstacles in front of a radar-mounted vehicle.

The radar apparatus 2 generally includes a transmitter 4, a two-channel receiver 6, an A/D converter circuit 8, and a microcomputer 10.

The transmitter 4 transmits a radar wave in the form of a millimeter wave through a transmitting antenna AS. A return of the radar wave (also referred to as a reflected wave below) from a target object such as a preceding vehicle or a roadside obstacle is received by eight receiving antennas AR1 to AR8 arrayed in line at regular intervals. The receiver 6 mixes signals received by adjacent two of the receiving antennas AR1 to AR8 with a local signal L supplied from the transmitter 4 to produce beat signals B1 and B2. The A/D converter circuit 8 consists of a pair of A/D converters AD1 and AD2 which samples the beat signals B1 and B2 from the receiver 6 cyclically to produce digital signals D1 and D2 (also referred to as digital beat signals below), respectively. The microcomputer 10 performs given operations, as will be discussed later in detail, on each of the digital beat signals D1 and D2 inputted from the A/D converter circuit 8.

The receiving antennas AR1 to AR8 have directivities different from each other. Adjacent two ARi and ARi+1 (i=1, 2, 3, . . . 7) of the receiving antennas AR1 to AR8 overlap partially in radiation patterns or beams with each other to form an overlapping lobe (also referred to as a monopulse area Mi below). In the following discussion, a portion of each monopulse area where a difference between signal levels at any two locations spaced at an angular interval of 4 [deg] away from each other is always more than 15[dB] will be referred to as a parallel traveling detectable zone (i.e., a zone shifted from the center line of each monopulse area either in the right or left direction by an angle of 2.5[deg] in this embodiment). The receiving antennas AR1 to AR8 are so arranged that the monopulse areas M1 to M7 are formed at intervals of 2.5[deg] or less to define the parallel traveling detectable zones continuing from each other without any disconnection. The transmission antenna AS has the beam width which covers all of the monopulse areas M1 to M7.

If a maximum radar detectable range is 50[m], and the width of a lane of a road is 3.5[m], each of the receiving antennas AR1 to AR8 is so designed in characteristic of the beam thereof that a difference in signal level between any point within the monopulse area and a point defined at an interval of 4[deg] away from the point within the monopulse area is 15 dB or more for detecting automobiles running side by side at an interval of the lane width (equivalent to an angle of 4[deg]) away from each other within an error of 0.5[m] that is approximately half a width of the automobiles (equivalent to an angle of 0.5[deg]).

Specifically, if levels of signals produced by receiving a radar wave reflected from a target vehicle within the monopulse area Mi (referred to as in-area vehicle ① below) through two of the receiving antennas AR1 to AR8 paired to form the monopulse area Mi are defined as V1a and V1b, and levels of signals produced by receiving a radar wave reflected from a second target vehicle lying within the monopulse area (referred to as in-area vehicle ② below) through the same receiving antennas are defined as V2a and V2b, levels Va and Vb of composite signals each produced by a mixture of the reflected waves in one of the receiving antennas are expressed in vector in FIG. 2(b). FIG. 2(b) illustrates for the case where differences between the levels V1a and V1b, arising from the in-area vehicle ① and the levels Va and Vb of the composite signals show maximum values, respectively, that is, where phases of the signals forming one of the composite signals are oriented perpendicular to each other. In the following discussion, it is assumed that $|V1a|=|V1b|=|V1|$, and $|V2a|=|V2b|=|V2|$.

Figure 2A:
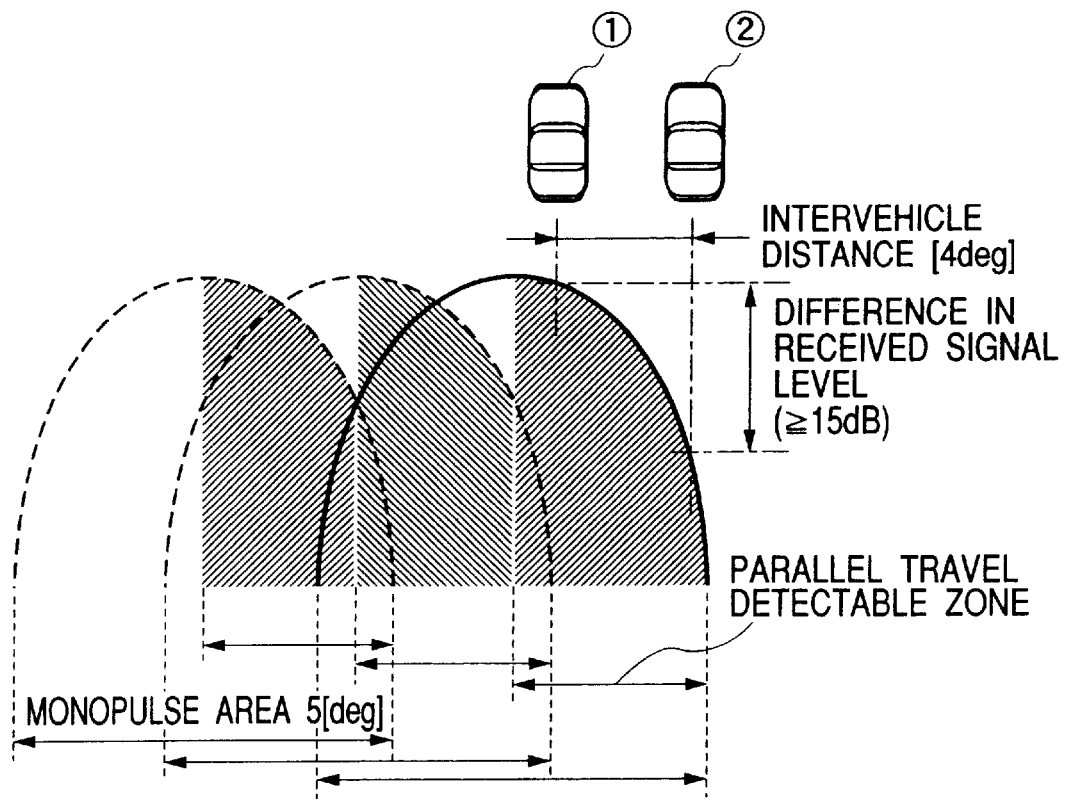
FIG. 2(a) shows monopulse areas defined by antenna beams of receiving antennas.
Figure 2B:
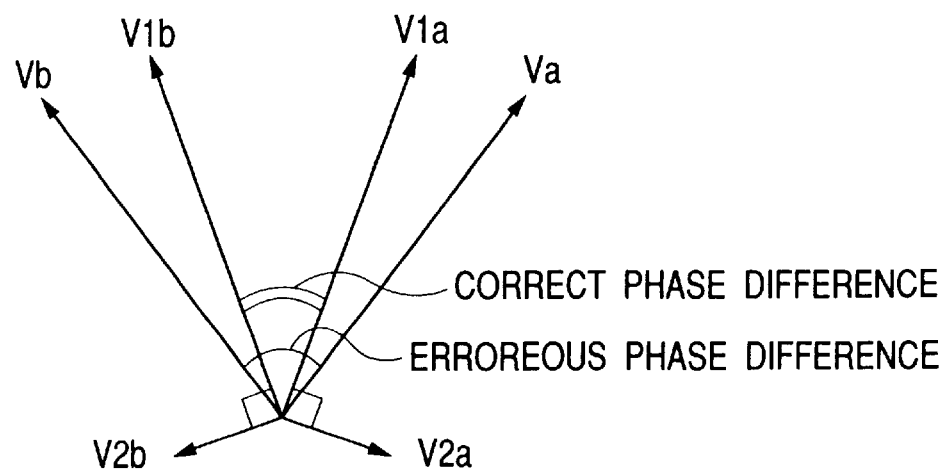
FIG. 2(b) is an illustration which represents, in vector, outputs of receiving antennas receiving returns of two targets shown in FIG. 2(a)

As apparent from FIG. 2(a), the phase of the wave produced by a mixture of the radar waves reflected from the in-area vehicle ① and the in-area vehicle ② is shifted between adjacent two of the receiving antennas by a maximum of $\tan^{-1}(|V2|/|V1|)$. A shift in phase difference $\Delta\theta y$ between the signals received by the paired receiving antennas is, thus, expressed by equation (1) below.

$$\Delta\theta y = 2 \times \tan^{-1}(|V2|/|V1|) \tag{1}$$

For instance, in a case where the azimuth is measured using the phase-difference monopulse techniques, the azimuth angle $\theta x$ is determined with one-to-one correspondence to the phase difference $\theta y$. A conversion ratio of the phase difference θy to the azimuth angle θx is so determined as to minimize an error of the azimuth determination. For example, if the monopulse area is defined by approximately 5[deg], the spaces between receiving antennas are so determined as to set the conversion ratio to about 40, as shown in equation (2) below.

$$\theta y = 40 \times \theta x + \theta c \quad (2)$$

where θc is a constant.

From Eq. (2), the relation between an azimuth angle error Δθx and the shift in phase difference Δθy may be given by equation (3) below.

$$\Delta\theta y = 40 \times \Delta\theta x \quad (3)$$

By substituting Eq. (1) into Eq. (3), we obtain $$|V2|/|V1| = \tan(20 \cdot \Delta\theta x) \quad (4)$$

As apparent from Eq. (4), decreasing the azimuth angle error Δθx below 0.5[deg] requires decreasing the level V2 of the signal produced by the wave reflected from the in-area vehicle ① below the level V2 of the signal produced by the wave reflected from the in-area vehicle ② minus 15 dB or more.

Referring back to FIG. 1, the transmitter 4 consists of a high frequency oscillator 12 and a distributor 14. The high frequency oscillator 12 produces a high frequency signal in a millimeter wave band which is so modulated as to vary with time like a triangular wave. The distributor 14 splits in power the high frequency signal produced by the high frequency oscillator 12 into the transmit signal Ss and the local signal L. The transmit signal Ss is radiated from the transmitting antenna As as a radar wave. The local signal L is supplied to the receiver 6.

The receiver 6 has two channels: a first channel ch1 including a selector SEL1, a mixer MX1, and an amplifier AMP1 and a second channel including a selector SEL2, a mixer MX2, and an amplifier AMP2. The selector SEL 1 is responsive to a selection signal S1 outputted from the microcomputer 10 to select one of the receiving antennas AR1, AR3, AR5, and AR7 to transmit a signal Sr1 received by the one of the receiving antennas AR1, AR3, AR5, and AR7 to the mixer MX1. The mixer MX1 mixes the signal Sr1 with the local signal L to produce the beat signal B1 that is a frequency component equivalent to a difference the signal Sr1 and the local signal L. The amplifier AMP1 amplifies the beat signal B1 and outputs it to the A/D converter circuit 8. The second channel ch2 is different from the first channel only in that the selector SEL2 1 is responsive to a selection signal S2 outputted from the microcomputer 10 to select one of the receiving antennas AR2, AR4, AR6, and AR8 to transmit a signal Sr2 received by the one of the receiving antennas AR2, AR4, AR6, and AR8 to the mixer MX2. Other operations are identical, and explanation thereof in detail will be omitted here.

Each amplifier AMPj(j=1, 2) is also designed to perform a filter function to remove unwanted high frequency components from the beat signal Bj.

The microcomputer 10 is made up of a CPU, a ROM, and a RAM and has an input port into which data is inputted from the A/D converter circuit 8, an output port outputting the selection signals S1 and S2, and a digital signal processor (DSP) used in performing a Fast Fourier Transform (FFT). Specifically, the microcomputer 10 produces the selection signals S1 and S1 so as to switch between the receiving antennas AR1, AR3, AR5, and AR7 and between the receiving antennas AR2, AR4, AR6, and AR8, in sequence, in synchronism with a frequency modulation cycle of the transmit signal Ss and performs an azimuth determination operation to determine the azimuth or angular direction of a target object based on sample values D1 and D2 of the beat signals B1 and B2 (will also be referred to as digital beat signals Dj below) each derived in one of the first and second channels ch1 and ch2.

In operation, when the radar wave is transmitted in the form of a frequency-modulated continuous wave (FM-CW) from the transmitting antenna AS of the transmitter 4, and the antennas AR1 to AR8 of the receiver 6 each receive a return of the radar wave, each receiver channel chj mixes through the mixer MXj the input signal Srj produced by the antenna ARj with the local signal L supplied from the transmitter 4 to produce the beat signal Bj made of a frequency component equivalent to a difference in frequency between the input signal Srj and the local signal L, amplifies and removes unwanted high frequency components from the beat signal Bj through the amplifier AMPj, and converts the beat signal Bj through the A/D converter ADj into the digital beat signals Dj. Each A/D converter ADj is designed to sample the beat signal Bj M times (M=512 in this embodiment) every half a cycle of periodic changes in frequency of the transmit signal Ss, that is, each time the frequency of the transmit signal Ss is modulated so as to increase or decrease linearly. In the following discussion, a period of time during which the frequency of the transmit signal Ss is modulated so as to increase in a linear fashion will be referred to as a modulated-frequency rising range, while in a period of time during which the frequency of the transmit signal Ss is modulated so as to decrease in the linear fashion will be referred to as a modulated-frequency falling range.

Figure 3:
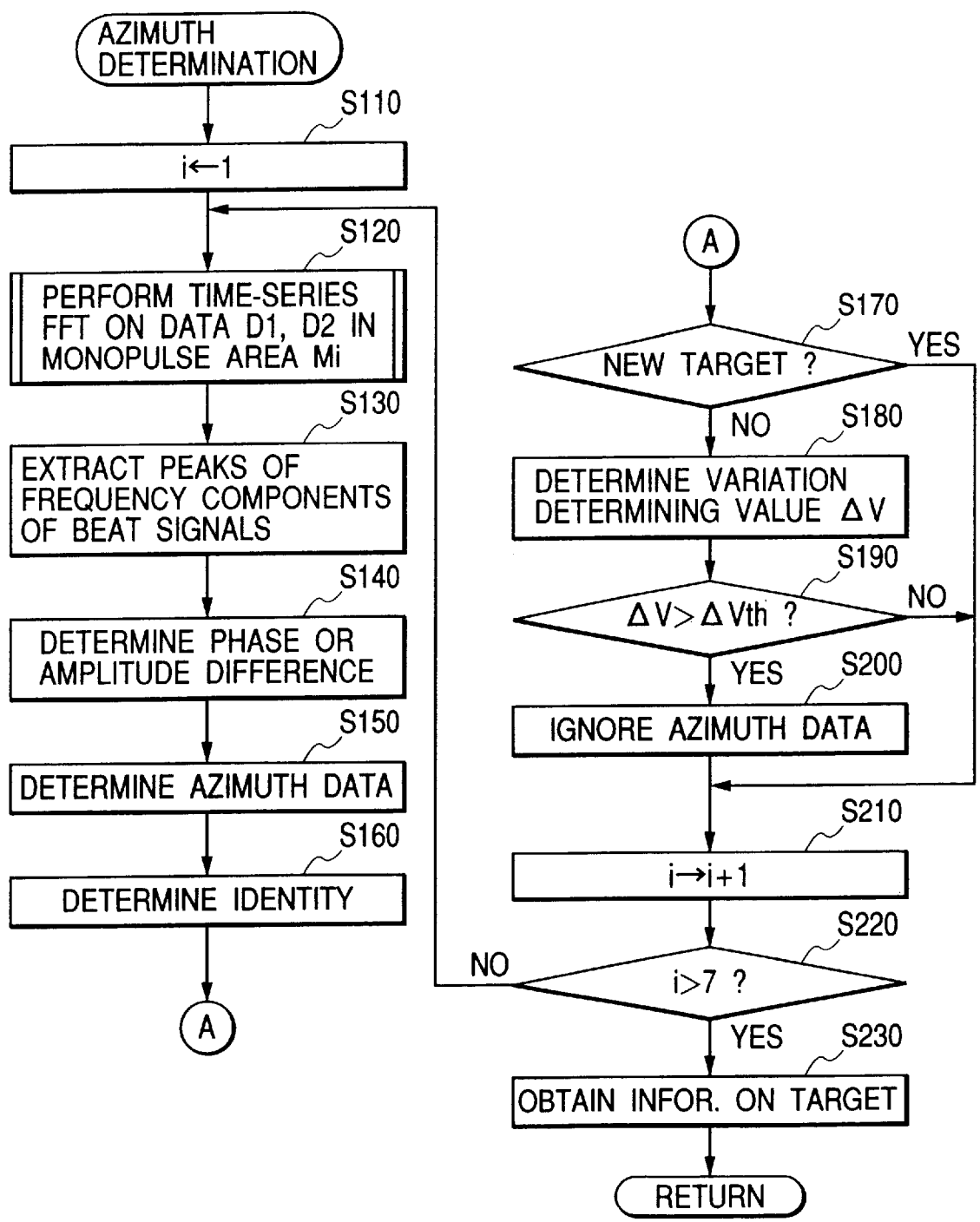
FIG. 3 is a flowchart of a program to determine the azimuth of a target.

FIG. 3 is a flowchart of a program performed by the microcomputer 10 to determine the azimuth or angular direction of a target object within the radar detectable zone. This program is executed each time the receiving antennas AR1 to AR8 have been all selected, in other words, the A/D converter circuit 8 stores the sample values D1 and D2 produced by sampling the beat signals Bj for one cycle of frequency changes in the transmit signal Ss which are produced by the signals Srj derived with respect to all the seven monopulse areas M1 to M7 each defined by adjacent two of the receiving antennas AR1 to AR8.

After entering the program, the routine proceeds to step 110 wherein an ID number i for identifying one of the monopulse areas Mi is initialized to one (1).

The routine proceeds to step 120 wherein a real Fourier Transform operation (will be referred to as a time-series FFT operation below) is performed, in time sequence, using the Fast Fourier Transform technique on each series of the sample values D1 and D2 derived in one cycle of frequency changes in the transmit signal Ss from the input signals Srj produced at the first and second channels ch1 and ch2 by returns of a radar wave received in one of the monopulse areas M1 to M7 (i.e., the monopulse area Mi) specified by the ID number i.

The routine proceeds to step 130 wherein the peak of frequency components is extracted at each of the first and second channels ch1 and ch2 from results of the time-series FFT operation in step 120 to determine the frequency of the beat signal Bj and the phase or amplitude (i.e., a signal strength) of a frequency component of the beat signal Bj.

The routine proceeds to step 140 wherein the frequency components derived in the first and second channels ch1 and ch2 are grouped according to the frequency, and a phase difference or an amplitude difference between the frequency components in each group are determined.

The routine proceeds to step 150 wherein azimuth data indicating the azimuth or angular direction of the target object is obtained from the phase or amplitude differences derived in step 140 using the known phase monopulse or amplitude monopulse techniques. The azimuth data may be obtained in each cycle of the program using a mathematical equation or by look-up using a phase difference (or amplitude difference)-to-azimuth translation table pre-installed in the microcomputer 10.

The routine proceeds to step 160 wherein an identity check operation is performed for determining whether or not the target object detected in this program cycle is identical with one detected in a previous program cycle in which a return of a radar wave from the same monopulse area Mi is processed. This determination may be made based on the following fact. The speed of movement of the target object is limited, and the relative speed of the radar-mounted vehicle and the target object and the distance to the target object usually change within in a limited range as a function of a cycle in which data are derived by returns of radar waves from the same monopulse area Mi. A frequency change will, thus, be within a limited range if the target objects are identical with each other.

The routine proceeds to step 170 wherein the results of the operation in step 160 are analyzed to determine whether the target object detected in this program cycle is a new one or not. If a YES answer is obtained, then the routine proceeds directly to step 210. Alternatively, if a NO answer is obtained meaning that the target object detected in this program cycle is identical with one detected in the previous program cycle, then the routine proceeds to step 180 wherein a variation determining value $\Delta V$ for determining a time-sequential variation in azimuth data obtained so far is calculated. The routine proceeds to step 190 wherein it is determined whether the variation determining value $\Delta V$ is greater than a variation threshold value $\Delta Vth$ or not. The variation determining value $\Delta V$ may be an average value of azimuth angles measured in the last N program cycles including this program cycle or a variance value thereof.

If a YES answer is obtained in step 190 meaning that the variation determining value $\Delta V$ is greater than the variation threshold value $\Delta Vth$, then the routine proceeds to step 200 wherein the azimuth data derived in step 150 is determined as ineffective data and proceeds to step 210. Alternatively, if a NO answer is obtained in step 190, then the routine proceeds directly to step 210.

In step 210, the ID number i is incremented by one (1) to select a subsequent one of the monopulse areas Mi.

The routine proceeds to step 220 wherein it is determined whether the ID number i is greater than seven (7) that is a total number of the monopulse areas Mi or not. If a NO answer is obtained meaning that azimuth data on all the monopulse areas Mi are not yet obtained, then the routine returns back to step 120. Alternatively, if a YES answer is obtained meaning that the azimuth data on all the monopulse areas Mi have been collected, then the routine proceeds to step 230 wherein based on the azimuth data on the monopulse areas M1 to M7, the azimuth angles and the number of target objects present ahead of the radar-mounted vehicle are determined, and the relative speed of the radar-mounted vehicle and the distance to each target are calculated based on beat signal frequencies in the frequency-modulated rising and falling ranges using the known FM-CW radar techniques.

As apparent from the above discussion, the radar apparatus 2 of this embodiment defines the monopulse areas M1 to M7 so as to enable automobiles running side by side to be discriminated from each other over the radar detectable zone. Specifically, when two automobiles are running side by side in front of the radar-mounted vehicle, one of them is always detected with a higher signal level, thereby making it possible to discriminate between the two automobiles.

Figure 4:
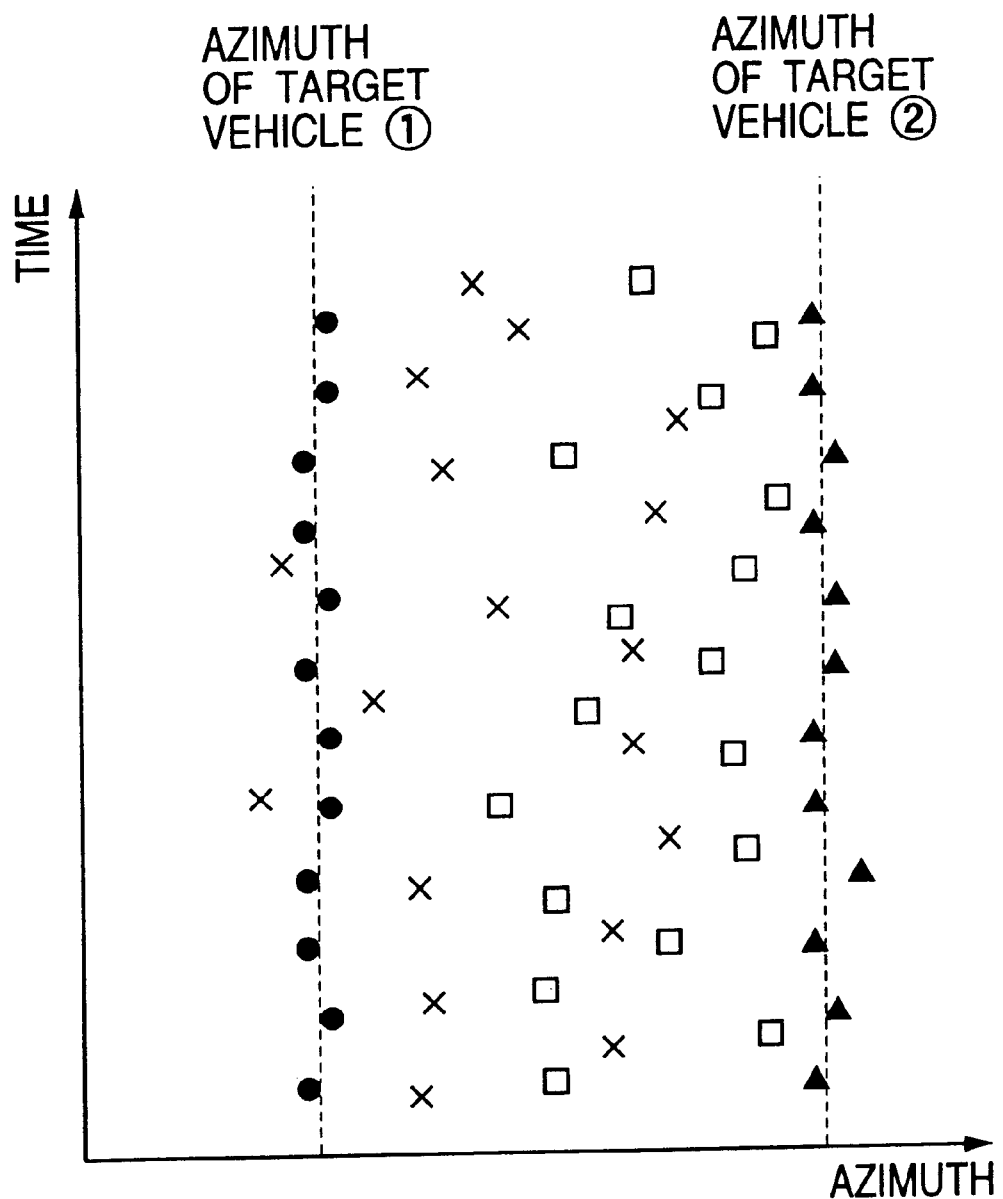
FIG. 4 shows an example of azimuth data obtained by radar returns from monopulse areas when two automobiles are running side by side.

For example, if target automobiles ① and ②, as shown in FIG. 4, running side by side are detected within a range of the monopulse areas M1 to M4, a return of a radar wave from one of the automobiles ① and ② is detected with a signal level higher than that from the other automobile in each of the monopulse areas M1 and M4 on both sides of the range, so that azimuth angles of the automobiles ① and ② are measured accurately. In each of the central monopulse areas M2 and M3, the returns of the radar wave from the automobiles ① and ② are detected with approximately equal signal levels, thus resulting in a variation in azimuth angle thereof. The degree of this variation is expressed in the variation determining value $\Delta V$ and compared with the variation threshold value $\Delta Vth$ to select the azimuth data obtained only in the monopulse areas M1 and M4 in which the time-sequential variation in azimuth data is small. This improves the accuracy in determining the azimuth of a target object and avoids undesirable control using incorrect azimuth data showing a greater time-sequential variation, thus resulting in greatly improved reliability of the control.

If a monopulse area producing unstable azimuth data (i.e., data whose variation is great) exists between a pair of monopulse areas producing stable azimuth data, the radar apparatus 2 may determine that two or more automobiles are running within an angular range over the monopulse areas producing the stable azimuth data and prohibit the determination of the azimuth of the targets. This is effective, especially in a case where there are three or more lanes on the road.

This embodiment uses the eight receiving antennas AR1 to AR8, but is not limited to the same. Any number of receiving antennas more than two may be used as long as a plurality of monopulse areas are provided in the radar detectable zone.

Further, use of a known scan mechanism designed to swing receiving antennas while keeping a preselected positional relation therebetween to scan a monopulse area over the radar detectable zone allows the number of the receiving antennas used in each of the first and second channels ch1 and ch2 to be decreased to one. Specifically, a single monopulse area formed by a pair of receiving antennas may be swung over the radar detectable zone by use of the scan mechanism.

Figure 5:
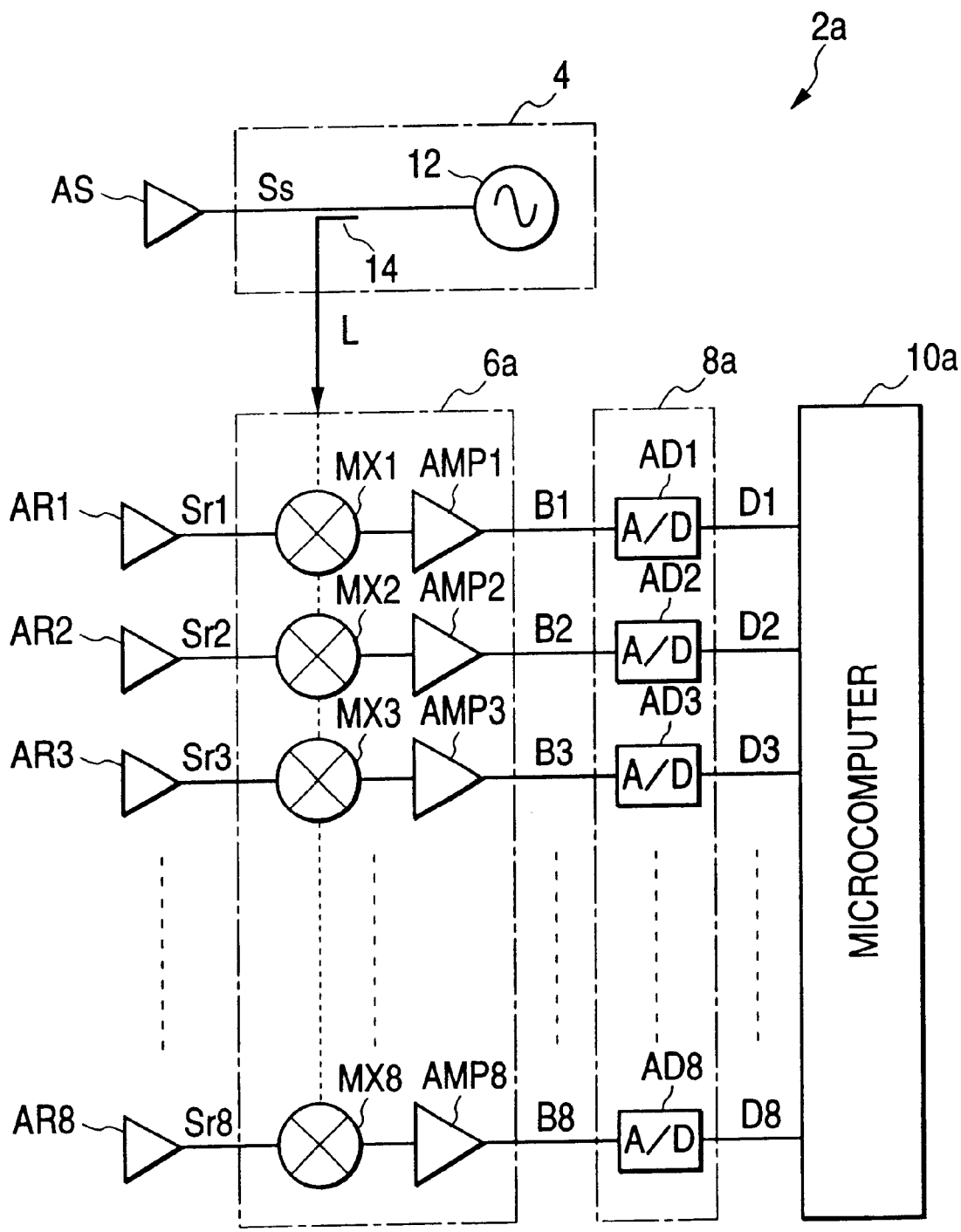
FIG. 5 is a block diagram which shows a radar apparatus according to the second embodiment of the invention.

FIG. 5 shows a radar apparatus 2a according to the second embodiment of the invention.

The radar apparatus 2a includes a eight-channel receiver 6a, an A/D converter circuit 8a, and a microcomputer 10a. The receiving antennas AR1 to AR8 have substantially the same directivity and cover the whole of the radar detectable zone. Other arrangements are identical with those in the first embodiment, and explanation thereof in detail will be omitted here.

The receiver 6a consists of eight mixers MX1 to MX8 and eight amplifiers AMP1 to AMP8 which are, as clearly shown in the drawings, connected to the receiving antennas AR1 to AR8 to process input signals Sr1 to Sr8 to provide beat signals B1 to B8 to the A/D converter circuit 8a, respectively. Each of the amplifiers AMP1 to AMP8, like the first embodiment, removes unwanted components from one of the outputs from the mixers MX1 to MX8.

The A/D converter circuit 8a consists of eight A/D converters AD1 to AD8 which sample the beat signals B1 to B8 to produce digital data (i.e., sample values) D1 to D8, respectively. The microcomputer 10a performs given operation, as will be described later, on the sample values D1 to D8 inputted from the A/D converter circuit 8a.

A combination of one of the mixers MX1 to MX8, one of the amplifiers AMP1 to AMP8, and one of the A/D converters AD1 to AD8 forms a receiver channel. This embodiments provides, as clearly shown in the drawing, eight receiver channels. In the following discussion, a receiver channel made up of the jth mixer MXj, the jth amplifier AMPj, and jth A/D converter ADj, handing the jth input signal Srj from the jth receiving antenna ARj will be referred to as a receiving channel chj.

The microcomputer 10a is made up of a CPU, a ROM, and a RAM and has an input port into which data is inputted from the A/D converter circuit 8, and a digital signal processor (DSP) used in performing a Fast Fourier Transform (FFT). Particularly, the microcomputer 10a of this embodiment performs an operation of the so-called digital beam forming, as will be discussed later, on the sample values D1 to D8.

In operation, when the radar wave is transmitted in the form of a frequency-modulated continuous wave (FM-CW) from the transmitting antenna AS of the transmitter 4, and the antennas AR1 to AR8 of the receiver 6a each receive a return of the radar wave from an object within a radar detectable zone, each receiver channel chj mixes through the mixer MXj the input signal Srj form the antenna ARj with the local signal L supplied from the transmitter 4 to produce the beat signal Bj made of a frequency component equivalent to a difference in frequency between the input signal Srj and the local signal L, amplifies and removes unwanted high frequency components from the beat signal Bj through the amplifier AMPj, and converts the beat signal Bj through the A/D converter ADj into the digital beat signals Dj. Each A/D converter ADj is designed to sample the beat signal Bj M times (M=512 in this embodiment) in each of the modulated-frequency rising and falling ranges.

Figure 6:
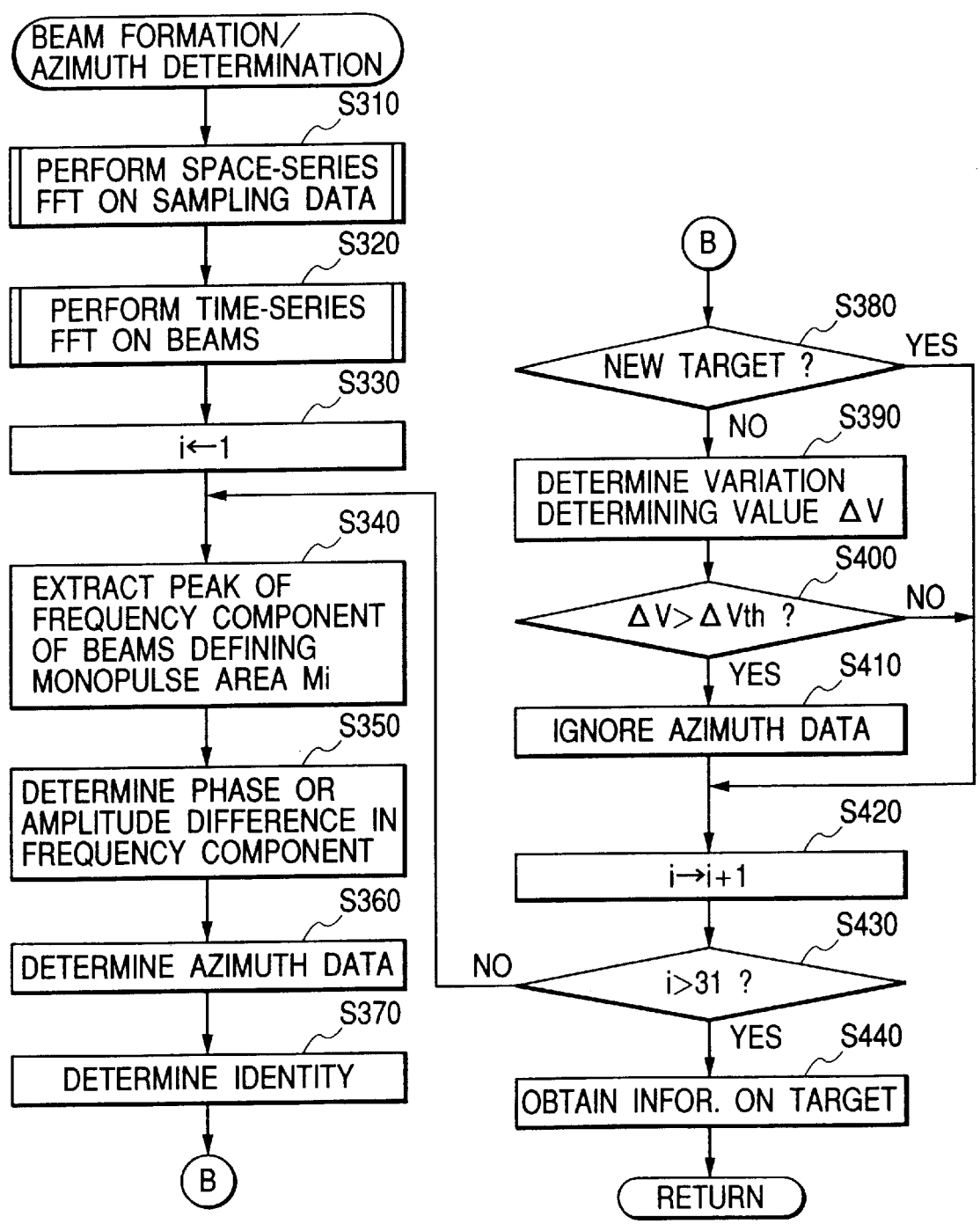
FIG. 6 is a flowchart of a program to determine the azimuth of a target in the second embodiment.

FIG. 6 is a flowchart of a program performed by the microcomputer 10a to determine the azimuth of a target object using the digital beam forming technique. This program is executed each time the A/D converter circuit 8a stores the sample values D1 to D8 derived in all the receiver channels ch1 to ch8 for one cycle of frequency changes in the transmit signal Ss.

After entering the program, the routine proceeds to step 310 wherein a complex Fourier operation is performed using the FFT techniques on each set of eight sample values D1 to D8 sampled simultaneously in all the receiver channels ch1 to ch8, which will also be referred to as a space-series FFT operation below. Specifically, twenty four dummy data of zero (0) are added to the eight sample values to perform a 32-point FFT operation, forming 32 beams which define thirty one partially overlapping lobs or monopulse areas M1 to M31. Like the first embodiment, the spacing between adjacent two of the receiving antennas AR1 to AR8 is so determined as to set the interval between the neighboring monopulse areas within a range which enables automobiles running side by side to be discriminated from each other accurately.

The routine proceeds to step 320 wherein the time-series FFT operation is performed on each of the thirty two beams formed in step 310 to analyze the frequency thereof in each of the modulated-frequency rising and falling ranges.

The routine proceeds to step 330 wherein an ID number i for identifying one of the monopulse areas Mi is initialized to one (1).

The routine proceeds to step 340 wherein the peak of frequency components of each of the beams paired to form the monopulse area Mi (i.e., the monopulse area M1 in the first program cycle) is determined based on results of the time-series FFT operation in step 320.

The routine proceeds to step 340 wherein the frequency components of the neighboring beams forming the monopulse area Mi are grouped according to the frequency, and a phase difference or an amplitude difference between the frequency components in each group are determined.

Following steps 350 to 440 are substantially identical with steps 140 to 230 in FIG. 3 except step 430 wherein it is determined whether the ID number i is greater than thirty one (31) that is a total number of the monpulse areas M1 to M31.

When two automobiles are running side by side within the monopulse areas M1 to M31, the radar apparatus 2a, like the first embodiment, always detects one of them with a higher signal level, thereby making it possible to discriminate between the two automobiles with high reliability levels.

The radar apparatus 2a is, as described above, designed to perform the space-series FFT operation on 32 sample values including dummy data to form 32 digital beams which define the 31 monopulse areas M1 to M31 logically to obtain azimuth data on each of the monopulse areas M1 to M31, thereby allowing an update cycle of the azimuth data to be shortened and improving the accuracy of various controls using the azimuth data of a target.

The time-series FFT operation may alternatively be performed prior to the space-series FFT operation. In this case, the time-series FFT operation is performed on each of the sample values D1 to D8. Of results of the time-series FFT operation, positive frequency components and negative frequency components have exactly the same information. The subsequent space-series FFT operation may, thus, be performed only on either of the positive and negative frequency components, thereby decreasing an operation load of the microcomputer 10a greatly.

The eight receiver channels ch1 to ch8 may be broken down into a first series channel handling the input signals Sr1 to Sr7 from the receiving antennas AR1 to AR7 other than the outermost receiving antenna AR8 and a second series channel handing the input signals Sr2 to Sr8 from the receiving antennas AR2 to AR8 other than the outermost receiving antenna AR1 for performing the space-series FFT operation on data in the first and second series channels, respectively, to form two series of digital beams. In this case, it is possible to form as many monopulse areas as the beams provided in each of the first and second series channels.

For example, a plurality of groups each made up of adjacent three of the beams may be formed to define monopulse areas using a mixture of the left and middle beams and a mixture of the right and middle beams in each group.

The number of receiving antennas used in this embodiment may be two or more. In a case where the dummy data are not added to sample values in the FFT operation, it is advisable that the number of receiving antennas be $2^n$ (n=positive integer) for performing the space-series FFT operation. In a case where the dummy data are added to sample values in the space-series FFT operation, it is advisable that a total number of the receiving antenna and the dummy data be $2^n$.

The antenna apparatus 2a of this embodiment may alternatively be made to have a so-called phased array antenna structure which includes phase shifters changing the phase of the antenna outputs to weight the antenna outputs and an adder adding outputs of the phase shifters together for forming the so-called digital beams.

The third embodiment of the invention will be described below which is different from the first embodiment only in location of the monopulse areas M1 to M7 defined by the receiving antennas AR1 to AR8 and a portion of the azimuth determining operation performed by the microcomputer 10. Other arrangements and operations are identical, and explanation thereof in detail will be omitted here.

Figure 15A:
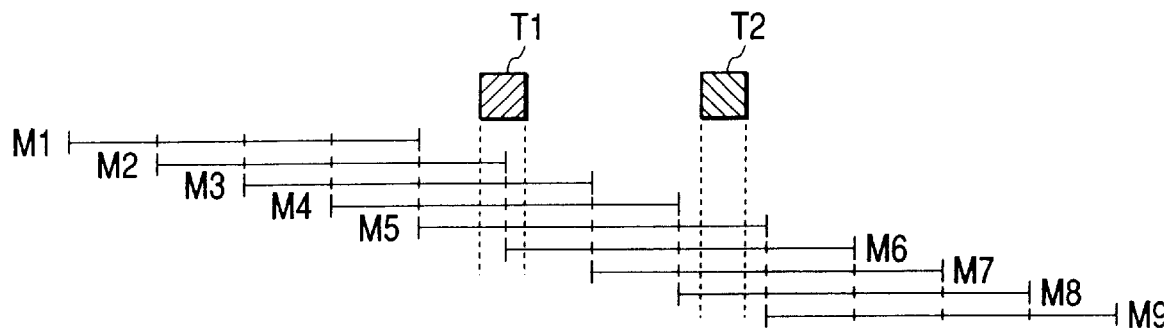
FIGS. 15(a) and 15(b) show examples of monopulse areas formed by a radar apparatus of the invention.
Figure 15B:
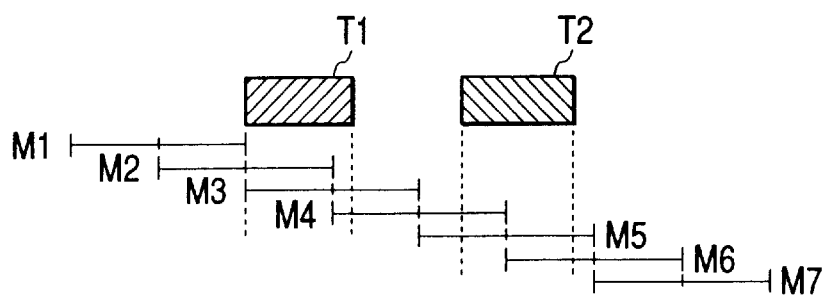

The receiving antennas AR1 to AR8 are so arranged that adjacent two of the monopulse areas M1 to M7 overlap, as shown in an example of FIG. 15($a$), with each other in three-fourths (¾) thereof. In the example of FIG. 15($a$), it is possible to detect a target in at least three consecutive monopulse areas in a wide range from M3 to M7.

Figure 7:
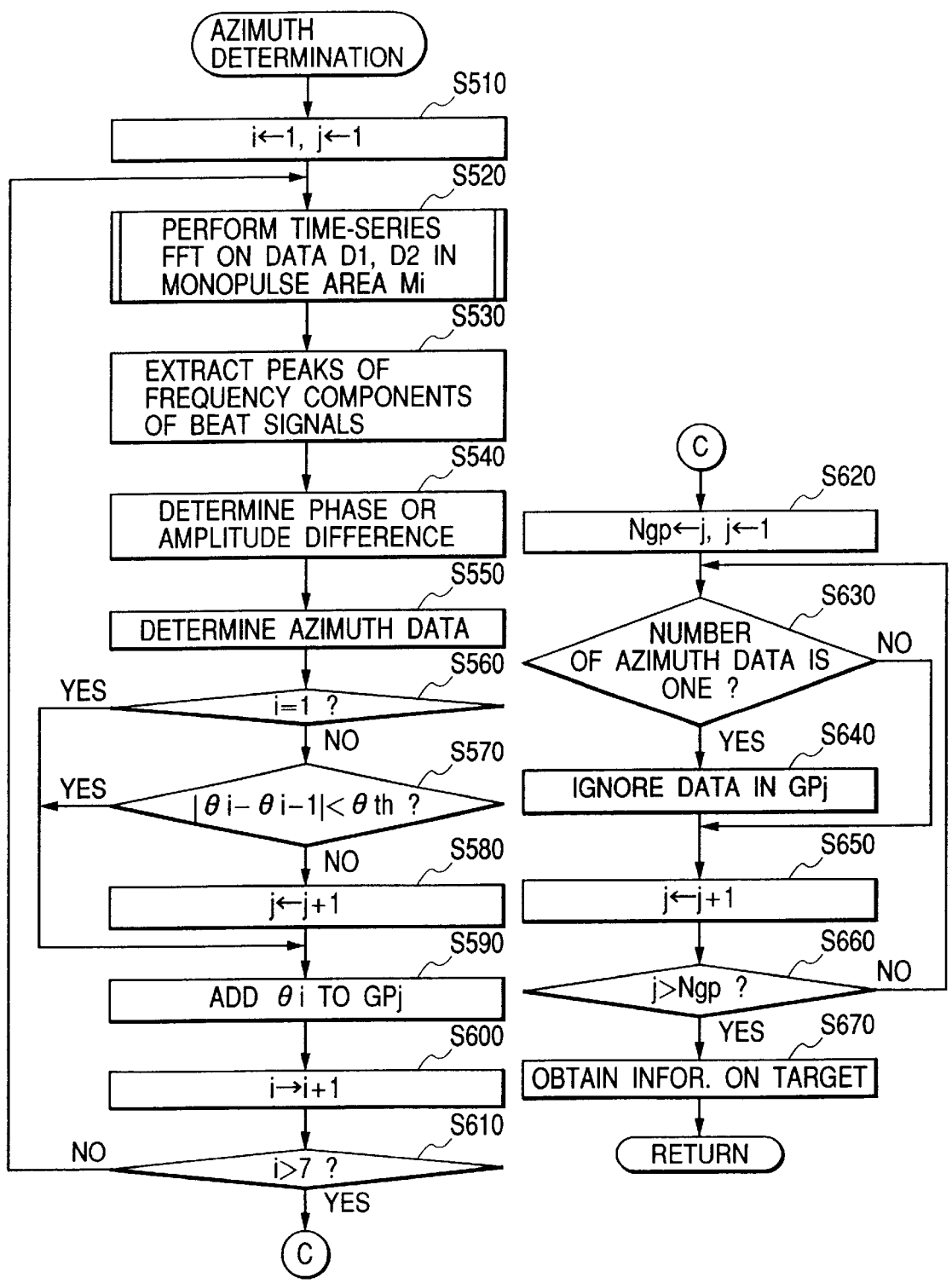
FIG. 7 is a flowchart of a program to determine the azimuth of a target according to the third embodiment.

FIG. 7 shows the azimuth determining operation of this embodiment which is, like the first embodiment, performed by the microcomputer 10 each time the A/D converter circuit 8 stores the sample values D1 and D2 produced by sampling the beat signals Bj for one cycle of frequency changes in the transmit signal Ss which are produced by the input signals Srj derived from returns of a radar wave from all the seven monopulse areas M1 to M7.

Upon initiation of the azimuth determining operation, the routine proceeds to step 510 wherein an ID number i for identifying one of the monopulse areas Mi and a ID number j for identifying one of azimuth data groups GRj, as will be described later, are initialized to one (1).

Following steps 520 to 550 are identical with steps 120 to 150 in the first embodiment. Specifically, the time-series FFT operation is performed on each series of the sample values D1 and D2 derived in one cycle of frequency changes in the transmit signal Ss from the input signals Srj produced at the first and second channels ch1 and ch2 (step 520). The results of the time-series FFT operation are analyzed to determine the frequency of the beat signal Bj and the phase or amplitude (i.e., a signal strength) of a frequency component of the beat signal Bj in each of the modulated-frequency rising and falling ranges (step 530). The frequency components in the first and second channels ch1 and ch2 are grouped according to the frequency, and a phase difference or an amplitude difference between the frequency components in each group are determined (step 540). The azimuth data θi indicating the azimuth or angular direction of the target object is determined based on the phase or amplitude differences (step 550).

Following steps 560 to 590 groups the azimuth data θi derived in step 550. Specifically, in step 560, it is determined whether the monopulse area ID number i is one or not. If a YES answer is obtained, then the routine proceeds directly to step 590. Alternatively, if a NO answer is obtained, then the routine proceeds to step 570 wherein it is determined whether an absolute value of a difference between the azimuth data θi-1 derived in step 550 one program cycle earlier and the azimuth data θi derived in step 550 in this program cycle is smaller than a preselected threshold value θth or not. If a YES answer is obtained, then the routine proceeds to step 590. Alternatively, if a NO answer is obtained, then the routine proceeds to step 580 wherein the group ID number j is incremented by one.

The routine proceeds to step 590 wherein the azimuth data θi derived in step 550 is added to the azimuth data group GPj. Specifically, when the azimuth data θi-1 derived one program cycle earlier is compared with the azimuth data θi derived in this program cycle, and it is determined that both are close to each other, the azimuth data θi and θi-1 are stored as falling in the same azimuth data group GP.

Alternatively, if the azimuth data θi and θi-1 are determined not to be close to each other, they are stored as belonging to different azimuth data groups GP.

Following steps 600 and 610 are identical with steps 210 and 220. Specifically, in step 600, the ID number i is incremented by one (1) to select a subsequent one of the monopulse areas Mi. In step 610, it is determined whether the ID number i is greater than seven (7) that is a total number of the monopulse areas Mi or not. If a NO answer is obtained meaning that azimuth data on all the monopulse areas Mi are not yet obtained, then the routine returns back to step 520. Alternatively, if a YES answer is obtained meaning that the azimuth data on all the monopulse areas Mi have been collected, then the routine proceeds to step 620.

In step 620, the group ID number j is stored as the number Ngp of the azimuth data groups GP and initialized to one again. The routine proceeds to step 630 wherein it is determined whether the number of data contained in the azimuth data group GPj is one or not. If a NO answer is obtained, then the routine proceeds directly to step 650. Alternatively, if a YES answer is obtained, then the routine proceeds to step 640 wherein the data in the azimuth data group GPj is determined as an ineffective value. The routine proceeds to step 650 wherein the group ID number j is incremented by one (1). The routine proceeds to step 660 wherein it is determined whether the group ID number j is greater than the azimuth data group number Ngp or not. If a NO answer is obtained, then the routine returns back to step 630. Alternatively, if a YES answer is obtained meaning that the above operations have been carried out on all the azimuth data groups GP, then the routine proceeds to step 670 wherein the azimuth data which are derived by radar returns from all the monopulse areas M1 to M7 and determined as effective values in step 630 are used to determine the azimuth angles and the number of target objects present ahead of the radar-mounted vehicle, and the relative speed of the radar-mounted vehicle and the distance to each target are calculated based on beat signal frequencies in the frequency-modulated rising and falling ranges using the known FM-CW radar techniques.

Figure 8:
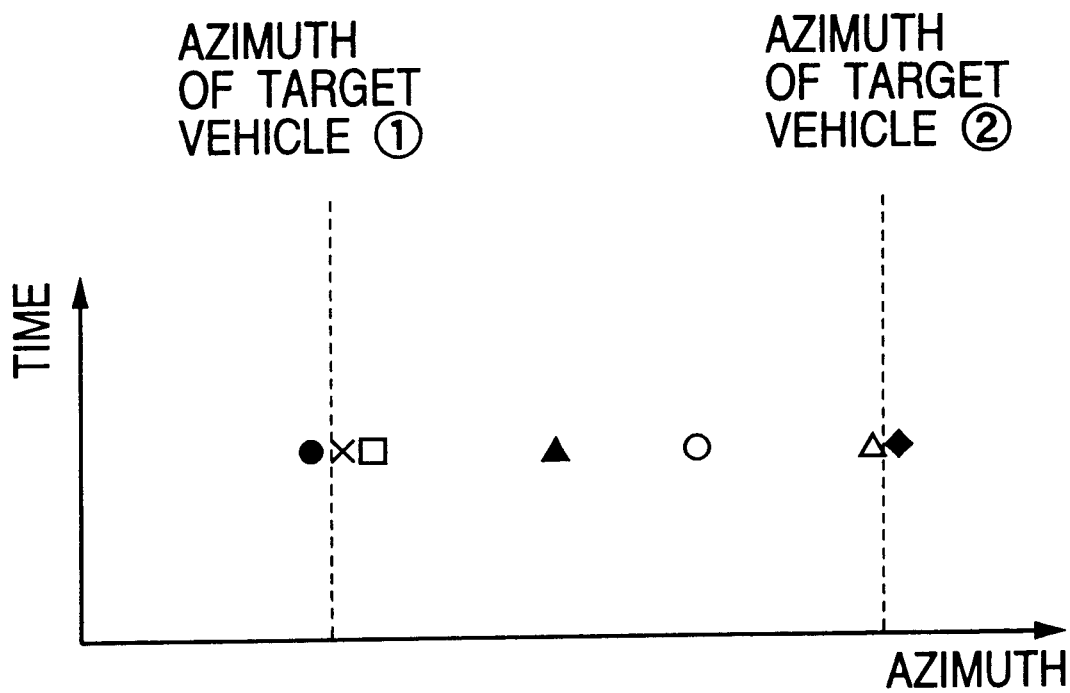
FIG. 8 shows an example of azimuth data obtained by radar returns from monopulse areas when two automobiles are running side by side in the third embodiment.

For instance, if target automobiles ① and ② running, as shown in FIG. 8, side by side at an interval away from each other are detected within a range of the monopulse areas M1 to M7, the azimuth data derived from the monopulse areas M1 to M3 are added to the azimuth data group GP1, the azimuth data derived from the monopulse area M4 is added to the azimuth data group GP2, the azimuth data derived from the monopulse area M5 is added to the azimuth data group GP3, and the azimuth data derived from the monopulse areas M6 and M7 are added to the azimuth data group GP4. In this case, only the azimuth data belonging to the azimuth data groups GP1 and GP4 are determined to be close to each other as effective values. Specifically, the azimuth of the target automobile ① is calculated using the data in the azimuth data group GP1, while the azimuth of the target automobile ② is calculated using the data in the azimuth data group GP4.

As described above, this embodiment defines the monopulse areas M1 to M7 so that three-fourths of adjacent two of them overlap with each other. This allows, even if target automobiles are running side by side in front of the radar-mounted vehicle, a plurality of monopulse areas to be always provided which may be used to determine the azimuth of each of the targets accurately.

The fourth embodiment of the invention will be described below which is different from the third embodiment only in a portion of the azimuth determining operation performed by the microcomputer 10. Other arrangements and operations are identical, and explanation thereof in detail will be omitted here.

Figure 9:
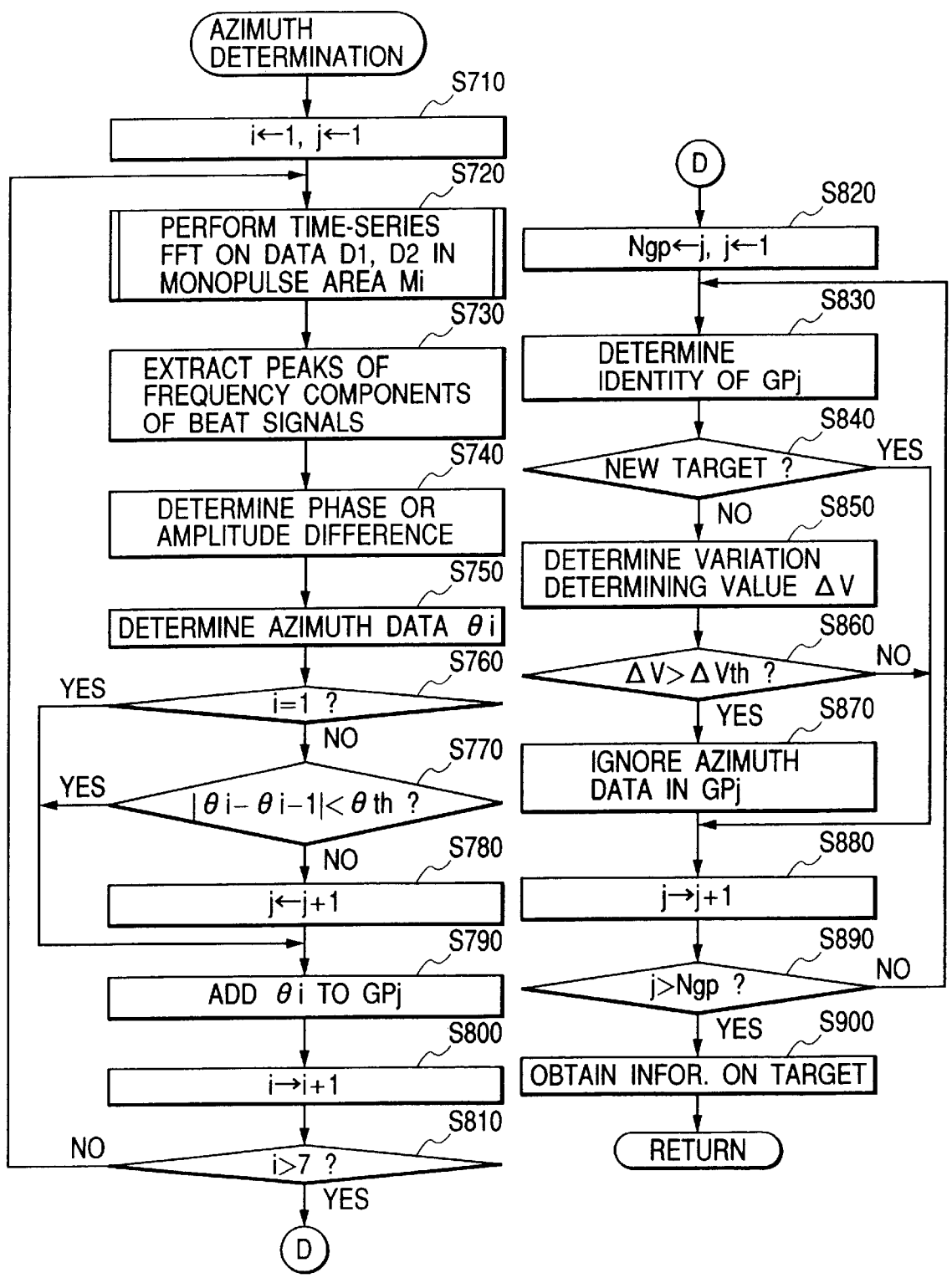
FIG. 9 is a flowchart of a program to determine the azimuth of a target according to the fourth embodiment.

FIG. 9 shows the azimuth determining operation of the fourth embodiment. Steps 710 to 820 are identical with steps 510 to 620. Following steps 830 to 870 are identical with steps 160 to 200 in the first embodiment shown in FIG. 3. Specifically, in step 830, an identity check operation is performed for determining whether the target object detected in this program cycle based on data in the azimuth data group GPj is identical with one detected in a previous program cycle based on data in the azimuth data group GPj or not. The routine proceeds to step 840 wherein the results of the operation in step 830 are analyzed to determine whether the target object detected in this program cycle is a new one or not. If a YES answer is obtained, then the routine proceeds directly to step 880. Alternatively, if a NO answer is obtained meaning that the target object detected in this program cycle is identical with one detected in the previous program cycle, then the routine proceeds to step 850 wherein a variation determining value $\Delta V$ for determining a time-sequential variation in azimuth data obtained so far is calculated. The routine proceeds to step 860 wherein it is determined whether the variation determining value $\Delta V$ is greater than a variation threshold value $\Delta Vth$ or not. If a YES answer is obtained meaning that the variation determining value $\Delta V$ is greater than the variation threshold value $\Delta Vth$, then the routine proceeds to step 870. Alternatively, if a NO answer is obtained, then the routine proceeds directly to step 880.

The identify check operation is, like the first embodiment, performed by comparing the frequencies of beat signals used in determining the azimuth data. If a plurality of azimuth data are contained in each azimuth data group GPj, a representative value of the azimuth data (e.g., an average value or a central value) is determined for the frequency comparison.

In step 880, the group ID number j is incremented by one (1). The routine proceeds to step 890 wherein it is determined whether the group ID number j is greater than the azimuth data group number Ngp or not. If a NO answer is obtained, then the routine returns back to step 830. Alternatively, if a YES answer is obtained meaning that the above operations have been carried out on all the azimuth data groups GP, then the routine proceeds to step 900 wherein the azimuth data which are derived by radar returns from all the monopulse areas M1 to M7 and determined as effective values in step 870 are used to determine the azimuth angles and the number of target objects present ahead of the radar-mounted vehicle, and the relative speed of the radar-mounted vehicle and the distance to each target are calculated based on beat signal frequencies in the frequency-modulated rising and falling ranges using the known FM-CW radar techniques.

Figure 10:
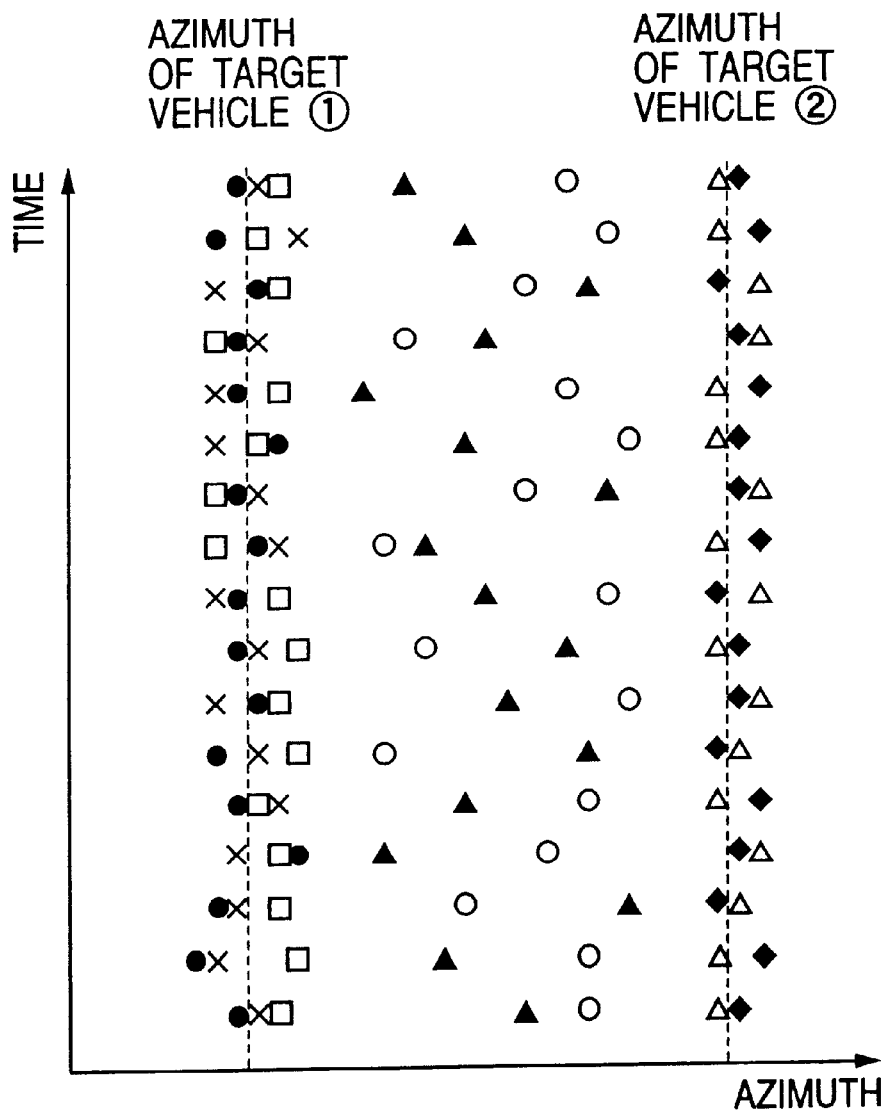
FIG. 10 shows an example of azimuth data obtained by radar returns from monopulse areas when two automobiles are running side by side in the fourth embodiment.
Figure 11A:
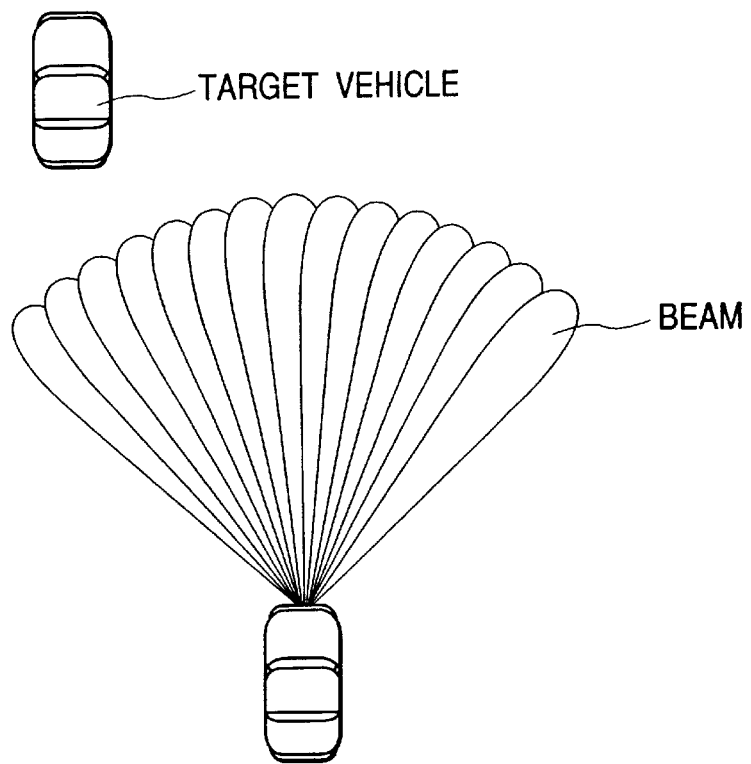
FIG. 11(a) shows a conventional beam scan radar system.
Figure 11B:
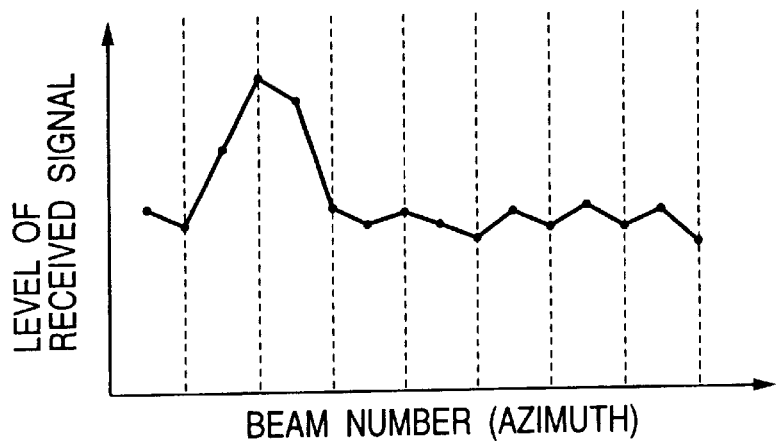
FIG. 11(b) shows distribution of levels of receiving antenna outputs in the system shown in FIG. 11(a)
Figure 12B:
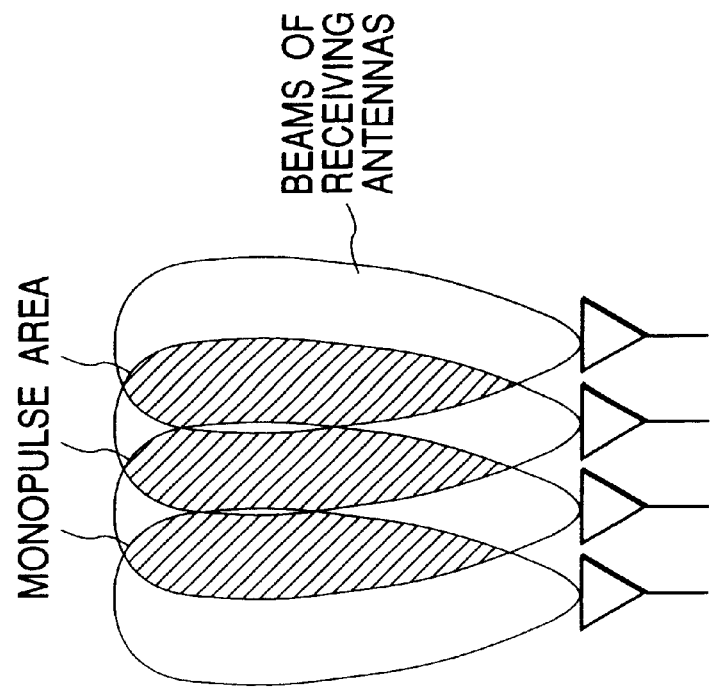
FIGS. 12(a) and 12(b) are explanatory views illustrating the principles of a conventional monopulse radar system.
Figure 12A:
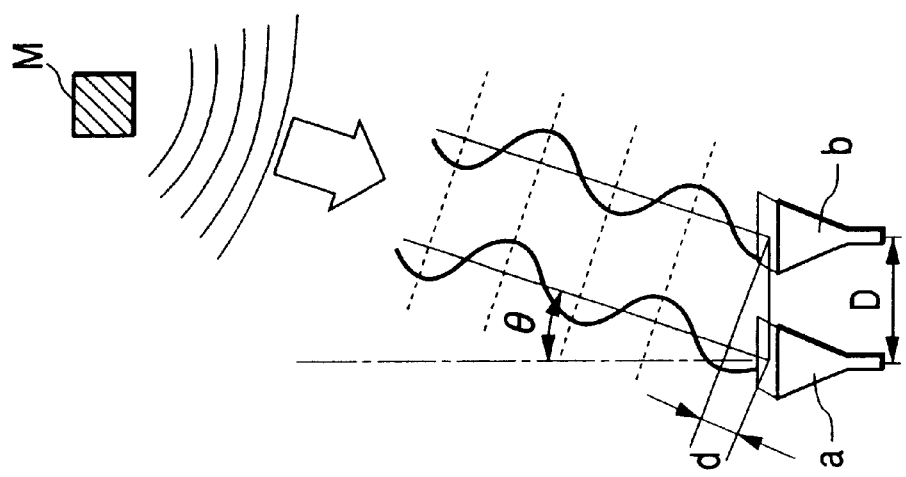
Figure 13A:
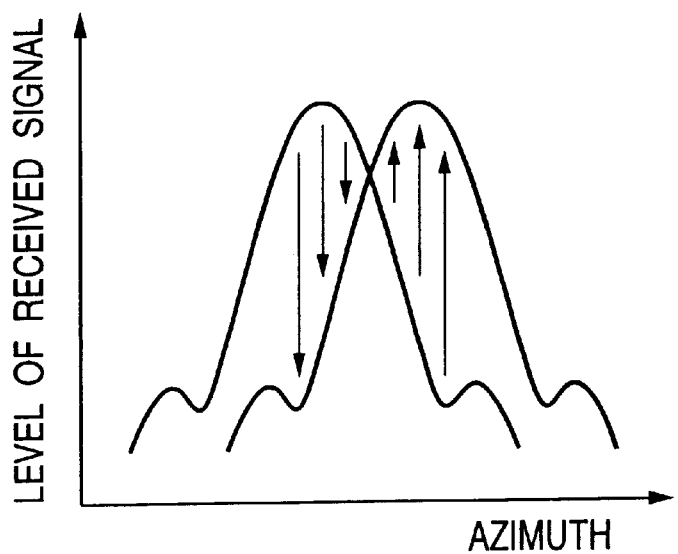
FIG. 13(a) shows levels of outputs of receiving antennas in a conventional monopulse radar system.
Figure 13B:
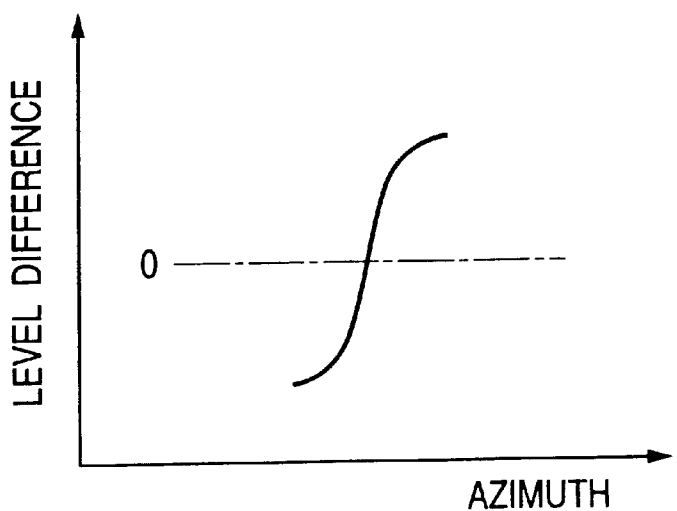
FIG. 13(b) shows a difference in level of the outputs shown in FIG. 13(a)
Figure 14A:
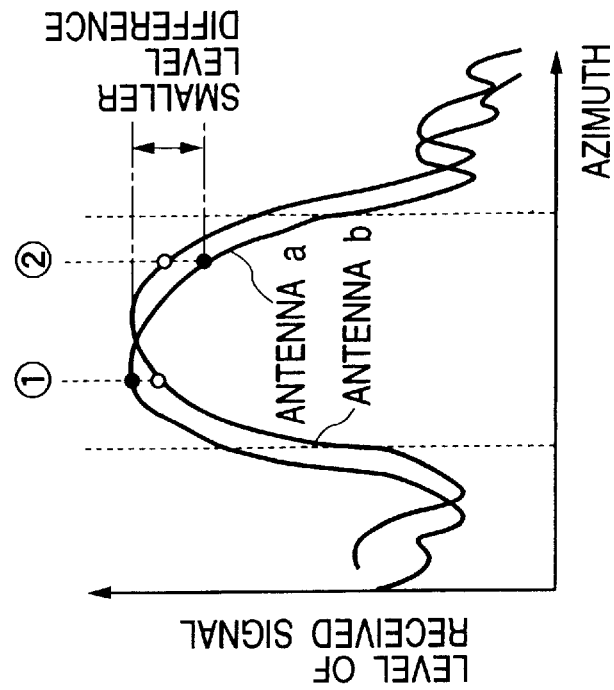
FIGS. 14(a) and 14(b) are explanatory views illustrating a problem a conventional monopulse radar system encounters.
Figure 14A:
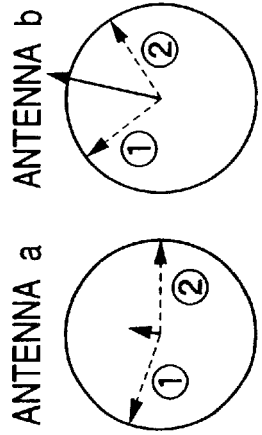
Figure 14B:
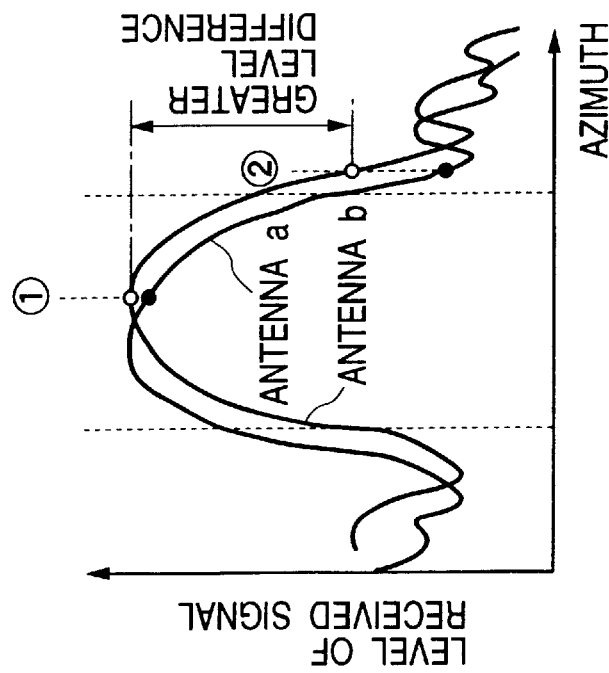
Figure 14B:
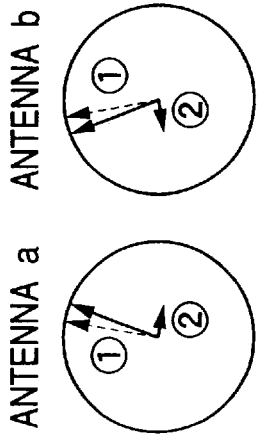

For instance, if target automobiles ① and ② running side by side at an interval, as shown in FIG. 10, away from each other are detected within a range of the monopulse areas M1 to M7, the azimuth data derived from the monopulse areas M1 to M3 are added to the azimuth data group GP1, the azimuth data derived from the monopulse area M4 is added to the azimuth data group GP2, the azimuth data derived from the monopulse area M5 is added to the azimuth data group GP3, and the azimuth data derived from the monopulse areas M6 and M7 are added to the azimuth data group GP4. In this case, only the azimuth data belonging to the azimuth data groups GP1 and GP4 are determined to be close to each other as effective values. Specifically, the azimuth of the target automobile ① is calculated using the data in the azimuth data group GP1, while the azimuth of the target automobile ② is calculated using the data in the azimuth data group GP4.

The fourth embodiment also performs the time-sequential variation determining operation on the azimuth data group GP containing a single data, but may perform it only on the azimuth data groups GP each containing a plurality of azimuth data. This decreases an operation load of the microcomputer 10.

The third and fourth embodiments define the monopulse areas M1 to M7 so that three-fourths of adjacent two of them overlap with each other, but the monopulse areas M1 to M7 may be formed, as shown in FIG. 15(*b*), so that one-half of adjacent two of them overlap with each other, and one-half of the width of each monopulse area Mi is smaller than the width of a target object. This enables, like the above embodiments, effective azimuth data to be always obtained in the two or more monopulse areas. The size of overlapping portions of the monopulse areas is not limited as long as it is greater than or equal to one-half of each monopulse area.

The third and fourth embodiments have been described as modifications of the first embodiment, but they may use the structure of the second embodiment which forms beams using the DBF techniques.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A radar apparatus comprising:
   a transmitter transmitting a radar wave;
   a signal receiver providing antenna beams which overlap with each other to define a plurality of monopulse areas, said signal receiver receiving a return of the radar wave from a target object in each of the monopulse areas to produce a pair of input signals;
   an angular direction data determining circuit processing the input signals produced in each of the monopulse areas to obtain angular direction data, in time sequence, each indicating an angular direction of the target object based on differences in one of amplitude and phase between components of the input signals; and
   a variation determining circuit determining a variation in angular direction data obtained, in time sequence, in each of the monopulse areas and determines the angular direction data whose variation is within a preselected allowable range as values effective in determining an angular direction of the target object.

2. A radar apparatus as set forth in claim 1, wherein said signal receiver is designed to provide the antenna beams thereof so that adjacent two of the monopulse areas partially overlap with each other.

3. A radar apparatus as set forth in claim 1, wherein said signal receiver includes a three or more receiving antennas which are located so as to have the antenna beams oriented in different directions, respectively, and so that adjacent two of the antenna beams define one of the monopulse areas.

4. A radar apparatus as set forth in claim 1, wherein said signal receiver includes a plurality of receiving antennas arrayed in line to have antenna beams thereof oriented in the same direction and a signal processing circuit summing outputs from said receiving antennas with given weighting to form the beams.

5. A radar apparatus as set forth in claim 4, wherein said signal processing circuit includes an analog-to-digital converter sampling the outputs from the receiving antennas to produce digital signals and an arithmetic circuit performing a complex Fourier Transform on the digital signals in space series along an array of the receiving antennas.

6. A radar apparatus as set forth in claim 5, wherein said arithmetic circuit adds null dummy signals to the digital signals produced by the analog-to-digital converter to increase the number of signals to undergo the complex Fourier Transform simultaneously more than the number of the outputs from the receiving antennas.

7. A radar apparatus comprising:

a transmitter transmitting a radar wave;

a signal receiver providing antenna beams which overlap with each other to define a plurality of monopulse areas, said signal receiver receiving a return of the radar wave from a target object in each of the monopulse areas to produce a pair of input signals;

an angular direction data determining circuit processing the input signals produced in each of the monopulse areas to obtain angular direction data each indicating an angular direction of the target object based on differences in one of amplitude and phase between components of the input signals; and a grouping circuit, if some of the angular direction data are close to each other within a given range, forming a group including the angular direction data close to each other within the given range; and a determining circuit determining the angular direction data in the group as values effective in determining an angular direction of the target object.

8. A radar apparatus comprising:

a transmitter transmitting a radar wave;

a signal receiver providing antenna beams which overlap with each other to define a plurality of monopulse areas, said signal receiver receiving a return of the radar wave from a target object in each of the monopulse areas to produce a pair of input signals;

an angular direction data determining circuit processing the input signals produced in each of the monopulse areas to obtain angular direction data each indicating an angular direction of the target object based on differences in one of amplitude and phase between components of the input signals; and a grouping circuit forming groups each including some of the angular direction data which are close to each other within a given range; and a determining circuit determining the angular direction data belonging to one of the groups whose time-sequential variation is within a preselected range as values effective in determining an angular direction of the target object.

* * * * *